Aug. 14, 1928. 1,680,868
J. W. GARDNER
PUMPING MECHANISM
Filed May 5, 1923    2 Sheets-Sheet 2
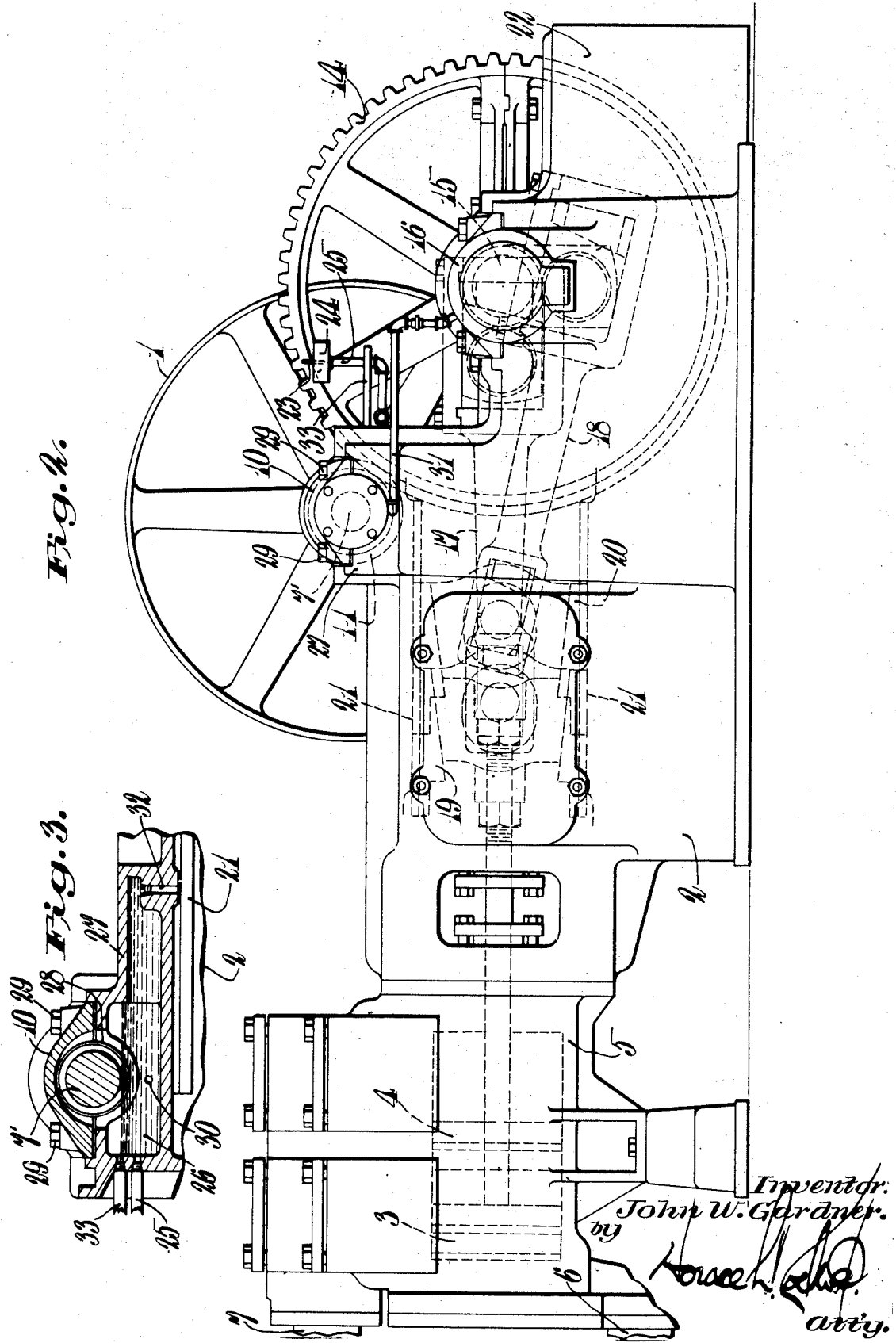
Inventor:
John W. Gardner.
by
atty.

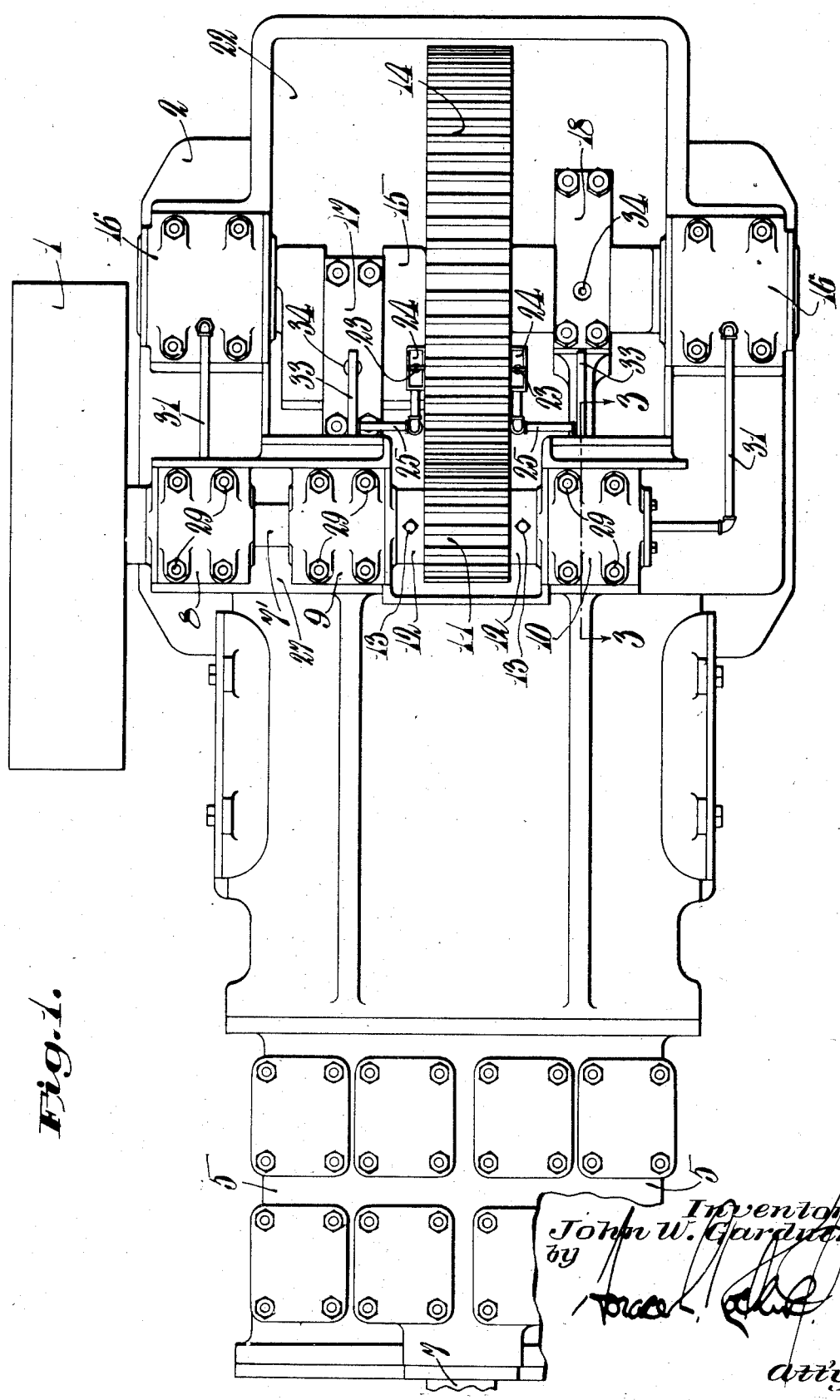

Patented Aug. 14, 1928.

1,680,868

UNITED STATES PATENT OFFICE.

JOHN W. GARDNER, OF QUINCY, ILLINOIS, ASSIGNOR, BY MESNE ASSIGNMENTS, TO GARDNER-DENVER COMPANY, A CORPORATION OF DELAWARE.

PUMPING MECHANISM.

Application filed May 5, 1923. Serial No. 636,882.

My invention relates to lubricating mechanism.

It has for its object to provide an improved lubricating mechanism, and more particularly an improved lubricating mechanism adapted to use in connection with pumps, engines, or the like. Another object of my invention is to provide improved means especially adapted to pumps or the like, operative to supplement the ordinary splash of the gearing and utilize lubricant carried up by a dipping gear and ordinarily largely returned to the bath in a splash lubricated device without performing any useful function. A further object of my invention is to provide improved lubricating mechanism for a pump or the like whereby through the utilization of such lubricant all the bearings of the same are constantly and automatically lubricated by the operation of the device itself. Still another object of my invention is to provide improved lubricating means especially adapted to use in connection with a duplex pump. These and other objects and advantages of my improved construction will, however, hereinafter more fully appear.

In the accompanying drawings I have shown for purposes of illustration one embodiment which my improved mechanism may assume in practice, the same being illustrated herein as applied to use in a pumping mechanism for liquid and more particularly mud fluid, of the type utilized in oil well work, although it will be evident that the invention may be utilized in other mechanisms or other pumping mechanisms, pumping other fluids than a liquid and adapted to use in different relations.

In these drawings,—

Fig. 1 is a plan view of this embodiment of my invention.

Fig. 2 is a side elevation of the same, certain parts being indicated in dotted lines to facilitate illustration.

Fig. 3 is a detail sectional view on line 3—3 of Fig. 1.

In this illustrative construction it will be noted that the pump mechanism shown is of a type adapted to be driven from any suitable source of power, as for example, an electric motor, not shown, herein adapted to cooperate through a belt with a pulley-fly wheel 1 carried at one side of the machine frame 2 and operatively connected to reciprocate parallel horizontal pistons 3 and 4 in suitably valved parallel horizontal cylinders 5 in order to pump liquid from an inlet 6 through an outlet 7, means hereinafter described being provided operatively connecting the pulley-fly wheel 1 with the pistons 3, 4 and improved means being provided to lubricate the bearings of the mechanism.

Referring more particularly to the power connections, it will be noted that the pulley-fly wheel 1 is carried on a transverse shaft 7' journaled in suitable bearings 8, 9, 10 on the machine frame 2. Of these, the bearing 8 is preferably as shown disposed between the pulley-fly wheel 1 and the bearing 9, while the bearings 9 and 10 are on opposite sides of a suitable pinion 11 fixed to the shaft 7' and suitably spaced from the bearings 9 and 10 by spacer sleeve members 12, herein as preferably removably connected as by set screws 13 to the shaft. As shown, the pinion 11 is in the form of a spur pinion and meshes with a larger spur or main gear 14 rotatable on an axis longitudinally spaced from and herein, as preferably, below the axis of the shaft 7', the axes of both gears herein lying in a plane disposed at an angle of substantially 45° to the horizontal and the construction being such that ample space is thus provided below the spur gear 14 for the mechanism connected to and driven by the rotation of the gear 14, all in a well known manner. More particularly it will be noted that herein the gear 14 is of two part removable construction and fixed on a driven shaft of suitable type, herein a crank shaft 15, heavier than the shaft 7' and journaled in suitable horizontal bearings 16 on opposite sides of the machine frame 2. One of these bearings 16 herein is disposed in substantial longitudinal alinement with the bearing 8 while the other is disposed symmetrically on the opposite side of the gear and outside the bearing 10. Upon this crank shaft 15 suitable connecting rods 17, 18 are also provided on opposite sides of the gear 14 and herein between the latter and the bearings 16. These connecting rods herein are disposed longitudinally of the mechanism, and connected through suitable cross heads 19, 20, movable in usual horizontal cross head guides 21 located on the frame 2 in planes below the shaft 7', with the parallel pistons 3 and 4 previously described. As a result of this construction it will be observed that when power is transmitted to the pulley-flywheel 1, the latter is rotated to rotate the shaft 7' and spur pinion 11 and thereby rotate the spur gear 14 in such manner as to cause rotation of the crank shaft 15 and consequent operation of the connecting rods to reciprocate the pistons 3 and 4 in the desired manner, the whole mechanism being so disposed as to enable a very compact and simple mechanism to be produced and one which at the same time is symmetrical and properly balanced, and also well adapted to lubrication as hereinafter described.

As usual in constructions such as hereinabove described, in which the spur gear 14 rotates about an axis below the axis of the shaft 7', it will be noted that the gear 14 dips into a large lubricant reservoir or chamber 22 formed in the frame 2 and disposed in rear of the shaft 7' and adapted to be partially filled as necessary with lubricant and covered by a usual removable cover. Further, it will be noted that the shaft 7' is disposed above and closely adjacent to the top of the gear 14 and to the cross head guides 21 and that it is also disposed above the bearings for the crank shaft 15. In my present invention, I have utilized these features of the construction in the production of improved lubricating means which supplement the usual splash lubrication of the parts within the casing and enable the parts requiring lubrication to be lubricated with a full supply of liquid lubricant delivered directly thereto. More particularly, I have herein provided improved means for utilizing and distributing the excess lubricant carried up by the gear 14 which ordinarily, i. e. where the splash system mentioned above is used, is simply returned directly to the bath without performing any lubricating function, this lubricant in my improvement being caused to be intercepted or collected from the gearing and conducted to the various bearing surfaces in need of lubricant. Herein, it will be observed that I have provided on each side of the gear 14 and preferably near the top thereof and adjacent the periphery thereof and the pinion 11, a lubricant collecting means adapted to receive and render available a portion of the lubricant carried up on the gear, the same herein including a wiper type deflector or so-called separator or scraper 23, each scraper being so disposed as to intercept or gather excess lubricant as the gear rotates. More particularly it will be noted that herein the scraper is vertically disposed so that it may cooperate with the gear whenever the latter is rotating in a counter-clockwise direction as shown in Fig. 2 or in the opposite direction, and thus act, irrespective of the direction of rotation of the gearing, to make available a supply of this excess lubricant. It will also be noted that the scraper is adapted to engage such a part of the gear or a part moving therewith as will not cause it to interfere in any way with the power transmitting function of the gear, while performing its separating function, the same herein, for example, engaging the side of the gear in such manner as to cause the excess lubricant carried on the side or flowing down from the teeth on to the side, to be separated from the gear. Herein it will also be noted that the lubricant thus deflected laterally is received in a pocket or chamber 24 forming a reservoir in which the deflector or scraper 23 is carried and which in turn is connected through piping 25 which herein acts to support the chamber 24 and also leads to a distributing chamber 26 located in the lower bearing block 27 of each of the bearings 8, 9, 10. As shown, each of these chambers 26 extends transversely relative to the shaft 7' and below the same, while one underlies the bearing 10 and the other underlies both of the bearings 8 and 9. Here attention is also directed to the fact that one or more rings 28 is suitably supported by the shaft 7' within each of the bearings 8, 9, 10, and that these rings extend down into the lubricant in the chambers 26 in such manner as to insure an adequate supply of lubricant to the shaft 7', access of course being had to the shaft and these rings by making the upper bearing blocks herein indicated 8, 9 and 10 removable as through suitable bolt connections 29. Moreover, it will be noted that each end chamber 26 is provided with a lateral outlet 30 well below the normal level of the lubricant therein, which outlet 30 is in turn connected through piping 31 with one of the bearings 16 of the crank shaft to supply lubricant in sufficient quantity thereto, one of these pipe connections extending laterally from the chamber 26 beneath the bearing block 10 as shown in Fig. 1 and the other extending from the chamber 26 beneath the bearing 8 to the other bearing 16. It will also be noted that one or more suitable passages 32, each herein opening directly downwardly and having if desired a suitably restricted inlet, communicate with the chambers 26, which are over the crossheads, at points adjacent the top of the latter and above the outlet 30 and lead to the upper cross head guides 21 in such manner as to insure an adequate supply of lubricant for the cross heads throughout their entire travel without possibility of draining the chamber or interrupting the supply of lubricant to the shaft 7' or to the bearings 16 through the pipe connections 31. For further lubrication and to maintain a proper lubricant level in the chambers 26 I have also provided pipe connections 33, herein disposed above the inlet connections 25, carrying off excess lubricant from the chambers to points above the connection of the connecting rods to the crank shaft, where the lubricant flowing through the pipes 33 is permitted to fall on to the connecting rods to lubricate the same as the excess is returned to the reservoir 22, lubricating apertures 34 herein also being provided in the connecting rods in order to insure a proper supply to the bearings on the crank shaft.

In the operation of my improved construction, the pistons are reciprocated in stepped relation as is usual in duplex pumping mechanism through the driving mechanism heretofore described, the rotation of the spur pinion 11 being conveyed to the spur gear 14 and the latter thereby being caused to rotate the crank shaft and operate the connecting rods and pistons as heretofore described. At the same time, it will be observed that the lubricant carried up by the gear 14 not only lubricates the pinion 11, cross head pins and lower cross head guides in a usual manner due to the drenching action resulting from the meshing of gear 14 with 11, but that a portion of the lubricant carried up on the gear 14, which would otherwise simply be returned to the bath, is separated and distributed in such manner as to enable it to lubricate the whole mechanism, this excess lubricant carried up by the gear being removed therefrom by the scrapers 23 and delivered by the latter to the chambers 24 and pipes 25 and to the distributing chambers 26, from which, in turn, the lubricant is distributed or delivered to the shaft 7' by the rings 28, to the bearings 16 by the pipes 31, to the upper cross head guides by the supply ports 32, and to the connecting rods, oil supply passages 34 therein, and reservoir 22 by the pipes 33, all in such manner as automatically to maintain a constant supply and circulation in adequate quantity to all the various parts of the mechanism requiring lubrication without requiring any attention on the part of the attendant other than to keep the lubricant reservoir or chamber 22 suitably filled.

As a result of my improved construction, it will be observed that it is made possible to utilize lubricant heretofore largely performing no function. Further, this lubricant is collected in such quantity as to enable it to supply, not only the shaft bearings of the different shafts but, herein, all the bearings of the mechanism. As a result of making this new and heretofore uncontrolled and largely unutilized supply of liquid lubricant available, it is also made possible to increase the supply to the bearings and to maintain a definite supply thereto so long as the supply in the main bath is sufficient to permit the main gear to carry up a coating of lubricant. It will also be noted that in this construction it is possible to supplement the lubricating effect of the splash system and at the same time to minimize the reliance placed on that system wherein the lubricant is merely splashed without control over all of the surfaces in the gear casing whether these surfaces need lubrication or not. Attention is also directed to the fact that in carrying out my invention it is possible to retain the pump mechanism and its connected gearing in standard form without disturbing the location of any of the accepted parts of such a mechanism or in any way disturbing the operation of the same. It will further be evident that, as a result of this invention, no necessity exists for special construction of the gear casing either to form a pressure chamber or to confine the dipping gear. There is also no necessity for disposing the pinion and its associated parts in such manner as to interfere with the other operating mechanism, or to provide a special flooding chamber immersing the pinion or one adapted to be flooded by a confined gear, or to provide a construction which is operative only when the gearing is rotated in one direction. Instead, my improved construction, in which the dipping gear may rotate within a casing substantially spaced from the gear, makes it possible to utilize a usual and relatively inexpensive form of casing. Moreover, it also provides ample room for the various operating parts desirably disposed substantially in the planes of the main shaft, such as the crosshead connections used in a pump or the like. Further, it will be observed that my improved construction is operative in either direction of rotation of the gearing. Also, the necessity for providing a high construction or one having reservoirs or a close fitting casing above the pinion, is also eliminated, the whole mechanism being herein capable of being located compactly and economically within the vertical limits of the dipping gear in a usual manner and so disposed that the jack shaft and its bearings are always readily accessible. These and other advantages of my invention will, however, be clearly apparent to those skilled in the art.

While I have herein specifically described for purposes of illustration this embodiment of my invention, it will be understood that this embodiment of the same is illustrative only and that the invention may be modified and embodied in various other forms and also adapted to use in devices for pumping any desired fluid or lubricating any desired mechanism of this general character, all of which it is my intention to include within the scope of the appended claims.

What I claim as new and desire to secure by Letters Patent is:

1. In combination, meshing gearing including a pinion and a driven gear, the latter dipping into an oil bath, longitudinally spaced shafts for said gearing, a crosshead including a driving connection operatively connected to said dipping gear and located at one side of the latter, bearings for said shafts on opposite sides of each of said gears including a bearing on the opposite side of said driving connection from said dipping gear, and supplemental means for collecting liquid lubricant carried up by said dipping gear and delivering said collected lubricant to the bearings of both shafts.

2. In combination, meshing gearing including a pinion and a driven gear, the latter dipping into an oil bath, longitudinally spaced shafts for said gearing, a crosshead including a driving connection operatively connected to said dipping gear and located at one side of the latter, bearings for said shafts on opposite sides of each of said gears including a bearing on the opposite side of said driving connection from said dipping gear, and supplemental means for collecting liquid lubricant carried up by said dipping gear and delivering collected lubricant to the bearings of both shafts having communicating means delivering lubricant to said crosshead.

3. In combination, meshing gearing including a pinion and a driven gear, the latter dipping into an oil bath, longitudinally spaced shafts for said gearing, a crosshead including a driving connection operatively connected to said dipping gear and located at one side of the latter, bearings for said shafts on opposite sides of each of said gears including a bearing on the opposite side of said driving connection from said dipping gear, and supplemental means for collecting liquid lubricant carried up by said dipping gear and delivering collected lubricant to the bearings of both shafts having communicating means delivering lubricant to said driving connection.

4. In combination, meshing gearing including a pinion and a driven gear, the latter dipping into an oil bath, longitudinally spaced shafts for said gearing, a crosshead including a driving connection operatively connected to said dipping gear and located at one side of the latter, bearings for said shafts on opposite sides of each of said gears including a bearing on the opposite side of said driving connection from said dipping gear, and supplemental means for collecting liquid lubricant carried up by said dipping gear and delivering collected lubricant to the bearings of both shafts having communicating means delivering lubricant to said crosshead and other communicating means delivering lubricant to said driving connection.

5. In combination, meshing gearing including a pinion and a driven gear, the latter dipping into an oil bath, longitudinally and vertically spaced shafts for said gearing, a crosshead located in horizontal planes beneath said pinion shaft including a driving connection operatively connected to said dipping gear and located at one side of the latter, bearings for said shafts on opposite sides of each of said gears including a bearing on the opposite side of said driving connection from said dipping gear, means for collecting sufficient lubricant carried up by said gear to lubricate the bearings of both shafts, and means for distributing the collected lubricant including provision for supplying it to the bearings for both shafts.

6. In combination, meshing gearing including a pinion and a driven gear, the latter dipping into an oil bath, longitudinally and vertically spaced shafts for said gearing, a crosshead disposed in horizontal planes located beneath said pinion shaft and including a driving connection operatively connected to said dipping gear and located at one side of the latter, bearings for said shafts on opposite sides of each of said gears including a bearing on the opposite side of said driving connection from said dipping gear, means operative to collect from liquid lubricant carried up by said gear and normally largely returned to the bath sufficient liquid lubricant to lubricate the bearings of both shafts, and means for distributing the collected lubricant including provision for supplying it to the bearings for both shafts.

7. In combination, gearing including a pinion and a cooperating gear dipping into an oil bath, shafts therefor, the pinion shaft being above and at one side of the dipping gear shaft, a cross-head disposed in horizontal planes located beneath said pinion shaft including a connection at one side of said dipping gear and operatively connected thereto, bearings for both ends of said shafts including a bearing on the opposite side of said connection from said dipping gear, means operative when the surface of said gear adjacent the pinion is traveling downward for collecting sufficient liquid lubricant carried up by said gear to lubricate the bearings for both shafts, and means for lubricating said shaft bearings therewith.

8. In combination, gearing including a pinion and a cooperating gear dipping into an oil bath, shafts therefor, the pinion shaft being above and at one side of the dipping gear shaft, a crosshead disposed in horizontal planes located beneath said pinion shaft including a connection at one side of said dipping gear and operatively connected thereto, bearings for both ends of said shafts including a bearing on the opposite side of said connection from said dipping gear, means operative when the latter is rotated in either direction for collecting sufficient liquid lubricant carried up by said gear to lubricate the bearings for both shafts, and means for lubricating said shaft bearings therewith.

9. In combination, meshing gearing including a pinion and a driven gear, the latter dipping into an oil bath, longitudinally spaced shafts for said gearing, a crosshead having a driving connection operatively connected to said dipping gear adjacent one side of the latter, bearings for said shafts on opposite sides of each of said gears including a bearing on the opposite side of said driving connection from said dipping gear, and supplemental lubricating means for said bearings including a plurality of means collecting liquid lubricant carried up by said dipping gear and each having a plurality of means delivering said collected lubricant to said shaft bearings.

10. In combination, meshing gearing including a pinion and a driven gear, the latter dipping into an oil bath, longitudinally spaced shafts for said gearing, a crosshead having a driving connection operatively connected to said dipping gear adjacent one side of the latter, bearings for said shafts on opposite sides of each of said gears including a bearing on the opposite side of said driving connection from said dipping gear, and supplemental lubricating means for said crosshead and said bearings including a plurality of means collecting liquid lubricant carried up by said dipping gear and each having a plurality of means delivering said collected lubricant to said shaft bearings and one having means delivering to said crosshead.

11. In combination, meshing gearing including a pinion and a driven gear, the latter dipping into an oil bath, longitudinally spaced shafts for said gearing, a crosshead having a driving connection operatively connected to said dipping gear adjacent one side of the latter, bearings for said shafts on opposite sides of each of said gears including a bearing on the opposite side of said driving connection from said dipping gear, and supplemental lubricating means for said crosshead, said driving connection, and said shaft bearings including a plurality of means collecting liquid lubricant carried up by said gear and each having a plurality of means delivering said collected lubricant to said shaft bearings and one having means delivering to said crosshead and driving connection.

12. In combination, meshing gearing including a pinion and a driven gear, the latter dipping into an oil bath, longitudinally spaced shafts for said gearing, crossheads having driving connections operatively connected to said dipping gear adjacent the opposite sides of the latter, bearings for said shafts on opposite sides of each of said gears including bearings on the opposite sides of said driving connections from said dipping gear, and supplemental means for collecting liquid lubricant carried up by said dipping gear and delivering the same to the bearings of both shafts having communicating means delivering lubricant to said crossheads and other communicating means delivering lubricant to said driving connections.

13. In combination, meshing gearing including a pinion and a driven gear, the latter dipping into an oil bath, longitudinally spaced shafts for said gearing, crossheads having driving connections operatively connected to said dipping gear adjacent the opposite sides of the latter, bearings for said shafts on opposite sides of each of said gears including bearings on the opposite sides of said driving connections from said dipping gear, and supplemental lubricating means each serving a different side of said gearing and including a plurality of means on different sides of said gearing collecting liquid lubricant carried up by said dipping gear and each having a plurality of means cooperating to deliver collected lubricant to a bearing for each shaft.

14. In combination, meshing gearing including a pinion and a driven gear, the latter dipping into an oil bath, longitudinally spaced shafts for said gearing, crossheads having driving connections operatively connected to said dipping gear adjacent the opposite sides of the latter, bearings for said shafts on opposite sides of each of said gears including bearings on the opposite sides of said driving connections from said dipping gear, and supplemental lubricating means each serving a different side of said gearing and including a plurality of means on different sides of said gearing collecting liquid lubricant carried up by said dipping gear and each having a plurality of means cooperating to deliver collected lubricant to a bearing for each shaft and to a crosshead.

15. In combination, meshing gearing including a pinion and a driven gear, the latter dipping into an oil bath, longitudinally spaced shafts for said gearing, crossheads having driving connections operatively connected to said dipping gear adjacent the opposite sides of the latter, bearings for said shafts on opposite sides of each of said gears including bearings on the opposite sides of said driving connections from said dipping gear, and supplemental lubricating means each serving a different side of said gearing and including a plurality of means on different sides of said gearing collecting liquid lubricant carried up by said dipping gear and each having a plurality of means cooperating to deliver collected lubricant to a bearing for each shaft, a cross head, and a driving connection.

16. In a lubricating device, cooperating rotating elements including a rotating member dipping in an oil bath, bearings for said elements, and means for collecting and delivering lubricant carried up by said gear to said bearings including a scraper acting on the side of said rotating member and piping supporting said scraper and forming a discharge therefrom.

17. In a lubricating device, cooperating rotating elements including a rotating member dipping in an oil bath, bearings for said elements, and means for collecting and delivering lubricant carried up by said gear to said bearings including a receptacle disposed adjacent the side of said rotating member, a scraper carried by said receptacle projecting upward therefrom into the path of the lubricant on the side of said member and delivering the same into said receptacle, and piping supporting said receptacle and forming a discharge therefrom.

18. In a lubricating device, a rotating member dipping in an oil bath, and means for collecting and delivering lubricant carried up thereby including a receptacle disposed adjacent the side of said rotating member, a scraper collector carried on said receptacle projecting upward therefrom into the path of the lubricant on the side of said member, said scraper being vertically disposed to cooperate with said member in either direction of rotation thereof, and piping supporting said receptacle and forming a discharge therefrom.

19. In combination, meshing gearing including a gear dipping in an oil bath, shafts therefor, bearings for said shafts, and means for lubricating said bearings including a scraper disposed adjacent said rotating gear and acting on the side thereof, piping supporting said scraper and receiving the discharge therefrom, and means for distributing the discharge from said piping to said bearings.

20. An operating mechanism comprising a power shaft having a rotatable pinion thereon and a plurality of bearings on opposite sides thereof, a crank shaft having a larger gear thereon rotatable in oil and meshing with said pinion, a bearing on each side of said gear, driven mechanism including a connecting rod connected to said crank shaft between one of said last mentioned bearings and said gear, and lubricating means for said bearings including a plurality of reservoirs automatically fed from lubricant carried up by said larger gear and normally largely unutilized and devices for supplying lubricant therefrom to the bearings of both shafts.

21. An operating mechanism comprising a power shaft having a rotatable pinion thereon and bearings on opposite sides of said pinion, a crank shaft having a larger rotatable gear thereon meshing with said pinion and having a bearing on each side of said gear, driven mechanism including a connecting rod connected to said crank shaft between one of said last mentioned bearings and said gear, means forming a lubricant reservoir into which said gear dips, and means for supplying in either direction of rotation of the gearing and to all of said bearings, lubricant carried up by said gear and normally returned to the bath by the gears without performing any lubricating function.

22. An operating mechanism comprising a power shaft having a rotatable pinion thereon and a plurality of bearings on opposite sides thereof, a crank shaft having a larger rotatable gear thereon meshing with said pinion and having a bearing on each side of said gear, driven mechanism including a connecting rod connected to said crank shaft between each of said last mentioned bearings and said gear, means forming a lubricant reservoir into which said gear dips, and means including a plurality of supply reservoirs adjacent the periphery of said gear for supplying lubricant carried up by said gear to the bearings of both shafts and returning the excess to said lubricant reservoir.

23. An operating mechanism comprising a power shaft carrying a rotatable pinion, a crank shaft carrying a larger rotatable gear meshing with said pinion, driven mechanism including connecting rods connected to said crank shaft on opposite sides of said larger gear, bearings for said shafts, a lubricant reservoir in which a portion of said larger gear rotates, and means for lubricating all of said bearings with lubricant carried up by said gear and fed by supply passages leading from adjacent the periphery of said gear.

24. An operating mechanism comprising a power shaft carrying a rotatable pinion, a crank shaft carrying a larger rotatable gear meshing with said pinion, driven mechanism including a connecting rod connected to said crank shaft on one side of said larger gear, means forming a lubricant reservoir in which a portion of said larger gear dips as it rotates, bearings for both of said shafts, and means for delivering to all of said bearings lubricant carried up by said larger gear including means adjacent the periphery of said gear collecting the supply for all of said bearings.

25. An operating mechanism comprising a power shaft carrying a rotatable pinion, a crank shaft carrying a larger rotatable gear meshing with said pinion, driven mechanism including connecting rods connected to said crank shaft on opposite sides of said larger gear and cross heads connected to said rods, means forming a lubricant reservoir in which a portion of said larger gear dips as it rotates, bearings for both of said shafts and said crossheads, and lubricating means therefor including a plurality of receiving chambers adjacent the periphery of said larger gear collecting sufficient lubricant from lubricant carried up by said gear to supply all of said bearings.

26. An operating mechanism comprising a power shaft carrying a rotatable pinion, a crank shaft carrying a larger rotatable gear meshing with said pinion, bearings for said shafts, driven mechanism including a connecting rod connected to said crank shaft at one side of said larger gear, means forming a lubricant reservoir into which said larger gear dips, and lubricating mechanism including a separator for removing lubricant from said larger gear, a communicating lubricant chamber receiving lubricant separated thereby, and means for lubricating from said chamber a bearing for each shaft.

27. An operating mechanism comprising a power shaft carrying a rotatable pinion, a crank shaft carrying a larger rotatable gear meshing with said pinion, bearings for said shafts, crosshead mechanism including a connecting rod connected to said crank shaft at one side of said larger gear, means forming a lubricant reservoir into which said larger gear dips, and lubricating mechanism including a separator for removing lubricant from said gear, a communicating lubricant chamber receiving lubricant separated thereby, and means for lubricating from said chamber a bearing of said crosshead and bearings for both of said shafts.

28. An operating mechanism comprising a power shaft carrying a rotatable pinion, a crank shaft carrying a larger rotatable gear meshing with said pinion, bearings for said shafts, crosshead mechanism including a connecting rod connected to said crank shaft at one side of said larger gear, means forming a lubricant reservoir into which said larger gear dips, and lubricating mechanism including a scraper for removing lubricant from said gear, a communicating lubricant chamber receiving lubricant separated thereby, and means for lubricating from said chamber a bearing of said crosshead and said connecting rod and bearings for both of said shafts.

29. An operating mechanism comprising a power shaft carrying a rotatable pinion, a longitudinally spaced driven shaft having a meshing larger gear rotatable by said pinion, driven mechanism including connecting rods connected on opposite sides of said meshing gear, a bearing for each end of each shaft, means forming a lubricant chamber into which said larger gear dips, means receiving lubricant carried up by said gear forming lubricant supply means above the axis of said driven shaft, and means for supplying lubricant from said supply means to the bearings of said power shaft and said driven shaft.

30. An operating mechanism comprising a power shaft carrying a rotatable pinion, a longitudinally spaced driven shaft having a meshing larger gear rotatable by said pinion, driven mechanism including crossheads and operatively connected connecting rods connected on opposite sides of said meshing gear, a bearing for each end of each shaft, means forming a lubricant chamber into which said larger gear dips, means receiving lubricant carried up by said gear forming lubricant supply means above the axis of said driven shaft, and means for supplying lubricant from said supply means to the bearings of said power shaft, driven shaft, and crossheads.

31. An operating mechanism comprising a power shaft carrying a rotatable pinion, a longitudinally spaced driven shaft having a meshing larger gear rotatable by said pinion, driven mechanism including crossheads and operatively connected connecting rods connected on opposite sides of said meshing gear, a bearing for each end of each shaft, means forming a lubricant chamber into which said larger gear dips, means receiving lubricant carried up by said gear forming lubricant supply means above the axis of said driven shaft, and means for supplying lubricant from said supply means to the bearings of said power shaft, driven shaft, crossheads and connecting rods.

32. An operating mechanism comprising a power shaft carrying a rotatable pinion, a longitudinally spaced driven shaft having a meshing larger gear rotatable by said pinion, driven mechanism including crossheads and operatively connected connecting rods connected on opposite sides of said meshing gear, a bearing for each end of each shaft, means forming a lubricant chamber into which said larger gear dips, means receiving lubricant carried up by said gear forming lubricant supply means above the axis of said driven shaft, and means for supplying lubricant from said supply means to the bearings of said power shaft, driven shaft, crossheads and connecting rods, said last mentioned means including reservoir means having a plurality of outlets disposed at different levels.

33. An operating mechanism comprising a power shaft having a rotatable pinion, a longitudinally spaced driven shaft having a meshing larger gear rotatable therewith, crosshead mechanism including connecting rods connected on the opposite sides of said meshing gear, bearings for said shafts, said crossheads and said connecting rods, means forming a lubricant chamber into which said larger gear dips, means receiving lubricant carried up by said gear including a plurality of lubricant chambers above the axis of said driven shaft and adjacent the periphery of said gear, and means for supplying lubricant from said last mentioned chambers to all of said bearings.

34. An operating mechanism comprising a power shaft having a pinion rotatable therewith, a crank shaft having a meshing larger gear rotatable therewith bearings for said shafts, crosshead mechanism including connecting rods connected to said crank shaft on the opposite sides of said meshing gear, means forming a lubricant chamber into which said larger gear dips, means receiving lubricant carried up by said gear forming a plurality of lubricant chambers above said crank shaft, and means for supplying lubricant from said last mentioned chambers including cooperating chambers fed thereby and members on said power shaft dipping into said cooperating chambers to lubricate said power shaft and supply passages leading from said cooperating chambers to the bearings for said crank shaft and said crossheads.

35. An operating mechanism comprising a power shaft having a pinion rotatable therewith, a crank shaft having a meshing larger gear rotatable therewith, bearings for said shafts, driven mechanism including connecting rods connected to said crank shaft on the opposite sides of said meshing gear, means forming a lubricant chamber into which said larger gear dips, means receiving lubricant carried up by said gear forming a plurality of lubricant chambers above said crank shaft, and means for supplying lubricant from said last mentioned chambers including cooperating chambers fed thereby and members on said power shaft dipping into said cooperating chambers to lubricate said power shaft, supply passages leading from said cooperating chambers to the bearings for said crank shaft, and excess lubricant removing passages communicating with said first mentioned chamber.

36. An operating mechanism comprising a power shaft having a pinion rotatable therewith, a crank shaft having a meshing larger gear rotatable therewith, bearings for said shafts, driven mechanism including connecting rods connected to said crank shaft on the opposite sides of said meshing gear, means forming a lubricant chamber into which said larger gear dips, means receiving lubricant carried up by said gear forming a plurality of lubricant chambers above said crank shaft, and means for supplying lubricant from said last mentioned chambers including cooperating chambers fed by said last mentioned chambers and members on said power shaft dipping into said cooperating chambers to lubricate said power shaft, supply passages leading from said cooperating chambers to the bearings for said crank shaft, and excess removing passages communicating with said first mentioned chamber and delivering lubricant on to said connecting rod connections.

37. An operating mechanism comprising a power shaft having a pinion rotatable therewith, a crank shaft having a meshing larger gear rotatable therewith, bearings for said shafts, connecting rods connected to said crank shaft on the opposite sides of said meshing gear, driven mechanism connected to said connecting rods including cross heads and upper and lower cross head guides, means forming a lubricant chamber into which said larger gear dips, means receiving lubricant carried up by said gear forming a plurality of lubricant chambers above said crank shaft, and means for supplying lubricant from said last mentioned chambers to the bearings of said shafts and to said upper cross head guides.

38. An operating mechanism comprising a power shaft having a pinion rotatable therewith, a crank shaft having a meshing larger gear rotatable therewith, bearings for said shafts, connecting rods connected to said crank shaft on the opposite sides of said meshing gear, driven mechanism connected to said connecting rods including cross heads and upper and lower cross head guides, means forming a lubricant chamber into which said larger gear dips, means receiving lubricant carried up by said gear forming a plurality of lubricant chambers above said crank shaft, means for supplying lubricant from said last mentioned chambers to the bearings of said shafts and to said upper cross head guides including supply passages communicating with said chambers, and a supply passage returning the excess lubricant to said first mentioned chamber.

39. An operating mechanism comprising a power shaft having a pinion rotatable therewith, a crank shaft having a meshing larger gear rotatable therewith, bearings for said shafts, connecting rods connected to said crank shaft on the opposite sides of said meshing gear, driven mechanism connected to said connecting rods including cross heads and upper and lower cross head guides, means forming a lubricant chamber into which said larger gear dips, means receiving lubricant carried up by said gear forming a plurality of lubricant chambers above said crank shaft, means for supplying lubricant from said last mentioned chambers to the bearings of said shafts and to said upper crosshead guides including cooperating chambers having supply passages communicating with said second mentioned chambers, and supply passages returning the excess lubricant from said cooperating chambers to said first mentioned chamber, said last mentioned passages being disposed above the inlets from said last mentioned chambers.

40. An operating mechanism comprising a plurality of longitudinally spaced shafts, a gear carried by one of said shafts and dipping in an oil bath, a non-dipping gear meshing with said dipping gear and rotatable therewith upon rotation of another shaft, bearings for each shaft on opposite sides of said gearing, means receiving lubricant carried up on said dipping gear and forming lubricant supply means above the axis of said dipping gear, and means for distributing lubricant from said supply means to the bearings of said shafts.

41. An operating mechanism comprising a plurality of longitudinally spaced shafts, a gear carried by one of said shafts and dipping in an oil bath, a non-dipping gear meshing with said dipping gear and rotatable therewith upon rotation of another shaft, bearings for each shaft on opposite sides of said gearing, a crosshead including a connecting rod operatively connected to be driven by rotation of said gear, means receiving lubricant carried up on said dipping gear and forming lubricant supply means above the axis of said dipping gear, and means for distributing lubricant from said supply means to the bearings of said shafts and to said crosshead.

42. An operating mechanism comprising a power shaft carrying a rotatable pinion between its ends, a longitudinally spaced driven shaft having between its ends a meshing gear rotatable by said pinion, bearings for each shaft on opposite sides of said gearing, a crosshead including a connecting rod operatively connected to be driven by rotation of said gear, means forming a lubricant chamber into which said gear dips, means receiving lubricant carried up by said gear and forming lubricant supply means above the axis of said driven shaft, and means for supplying lubricant from said supply means to the bearings of said power shaft and of said driven shaft and to said crosshead in either direction of rotation of said gear.

43. An operating mechanism comprising a power shaft carrying a rotatable pinion between its ends, a longitudinally spaced driven shaft having between its ends a meshing gear rotatable by said pinion, bearings for each shaft on opposite sides of said gearing, crossheads each having a connecting rod operatively connected between said gear and one of its shaft bearings and driven by rotation of said gear, means forming a lubricant chamber having its walls substantially spaced from said gear and into which said gear dips, means receiving lubricant carried up by said gear and forming lubricant supply means above the axis of said driven shaft, and means for supplying lubricant from said supply means to the bearings of said power shaft and of said driven shaft and to said crossheads.

44. An operating mechanism comprising a plurality of longitudinally spaced shafts, a gear carried by one of said shafts and dipping in an oil bath, a non-dipping gear meshing with said dipping gear and rotatable therewith upon rotation of another shaft, bearings for each shaft on opposite sides of said gearing, means separating liquid lubricant from that carried up on said dipping gear and forming lubricant supply means above the axis of said dipping gear, and means distributing said separated lubricant from said supply means to said shaft bearings.

45. An operating mechanism comprising a power shaft carrying a rotatable pinion between its ends, a driven shaft having between its ends a meshing gear rotatable by said pinion, bearings for each shaft on opposite sides of said gearing, a crosshead having a connecting rod operatively connected to be driven by rotation of said gear, means forming a lubricant bath into which said gear dips, means separating liquid lubricant from that carried up by said dipping gear and forming lubricant supply means above the axis of said driven gear, and means distributing said separated lubricant to the bearings of both shafts and to said crosshead.

46. An operating mechanism comprising a power shaft carrying a rotatable pinion between its ends, a driven shaft having between its ends a meshing gear rotatable by said pinion, bearings for each shaft on opposite sides of said gearing, crossheads each having a connecting rod operatively connected between said gear and one of its shaft bearings to be driven by rotation of said gear, means forming a lubricant bath into which said gear dips, means separating liquid lubricant from that carried up by said dipping gear and forming lubricant supply means above the axis of said driven gear, and means distributing said lubricant to the bearings of both of said shafts and to said crossheads.

47. An operating mechanism comprising a power shaft carrying a rotatable pinion between its ends, a driven shaft having between its ends a meshing gear rotatable by said pinion, bearings for each shaft on opposite sides of said gearing, a crosshead having a connecting rod operatively connected to be driven by rotation of said gear, means forming a lubricant bath into which said gear dips, means separating liquid lubricant from that carried up on the periphery of said gear and forming lubricant supply means above the axis of said driven gear delivering at each side of the periphery of the latter, and means distributing said separated lubricant at each side of said gearing to the shaft bearings on that side of the gearing.

48. An operating mechanism comprising a power shaft carrying a rotatable pinion between its ends, a driven shaft having between its ends a meshing gear rotatable by said pinion, bearings for each shaft on opposite sides of said gearing, crossheads each having a connecting rod operatively connected between said gear and one of its shaft bearings to be driven by rotation of said gear, means forming a lubricant bath into which said gear dips, means operative in either direction of rotation of the gear separating liquid lubricant from that carried up on the periphery of said gear and forming lubricant supply means above the axis of said driven gear delivering at each side of the periphery of the latter, and means distributing said separated lubricant at each side of said gear to the shaft bearings and crosshead on that side of the gearing in either direction of rotation of said gear.

In testimony whereof I affix my signature.

JOHN W. GARDNER.